United States Patent [19]

Dawdy

[11] 4,397,707

[45] Aug. 9, 1983

[54] COMPOSITIONS AND METHODS FOR IMPROVING ADHESION TO PLASTIC SUBSTRATES

[75] Inventor: Terrance H. Dawdy, Erie, Pa.

[73] Assignee: Lord Corporation, Erie, Pa.

[21] Appl. No.: 340,912

[22] Filed: Jan. 20, 1982

[51] Int. Cl.$^3$ .............................................. C09J 5/02
[52] U.S. Cl. ................................. 156/307.5; 156/310; 156/314; 156/315; 427/412.5; 428/423.7; 428/424.4; 525/509; 528/58
[58] Field of Search ......................... 525/509; 528/58; 428/423.7, 424.4; 427/412.5; 156/307.5, 315, 310, 314

[56] References Cited

U.S. PATENT DOCUMENTS

| | | | |
|---|---|---|---|
| 2,349,756 | 5/1944 | Pratt | 525/509 |
| 3,268,467 | 8/1966 | Rye et al. | 525/509 |
| 3,480,591 | 11/1969 | Oertel et al. | 525/509 |
| 3,626,023 | 12/1971 | Brizgys | 528/58 |
| 3,658,763 | 4/1972 | Dehm | 528/58 |
| 3,945,875 | 3/1976 | Jackson | 156/315 |

*Primary Examiner*—John J. Gallagher
*Attorney, Agent, or Firm*—John A. Gazewood

[57] ABSTRACT

Adhesion between an adhesive of the class of polymerizable liquid ethylenically unsaturated compounds containing a single vinyl group and solid polyester-containing plastic materials is improved by treating the substrate with a primer composition comprising an aromatic polyisocyanate and an amino resin and moisture-curing the polyisocyanate compound prior to application of the adhesive. The adhesive-joined assemblies are cured in a first stage at room temperature and, in a second stage, are post-baked at 100° to 150° C. to complete cure of the adhesive and the primer.

10 Claims, No Drawings

COMPOSITIONS AND METHODS FOR IMPROVING ADHESION TO PLASTIC SUBSTRATES

FIELD OF THE INVENTION

The present invention relates to improving adhesion to plastic materials. More particularly, the invention is concerned with primer compositions which are suitable for use in improving adhesion to plastic materials, especially such materials containing filler and reinforcing additives, and to methods for obtaining such improved adhesion.

Attention is called to the following U.S. Pat. Nos. 3,242,230 (Habic); 3,542,718 (Davis et al.); 3,846,368 (Pettit, Jr. ); 3,877,998 (Gudhe); 3,962,498 (Owston); 4,017,556 (Wang); 4,022,726 (Zabrocki et al.); 4,029,626 (Gillemont et al.); 4,049,607 (Berghoff); 4,049,847 (Eisentraeger et al.); 4,103,065 (Gagnon); 4,113,793 (Sekmakas); 4,180,493 (Selbeck et al.).

The invention provides for a two-part primer composition suitable for bonding plastic materials, including nonreinforced and reinforced plastic materials, to the same or different plastics, without the need for sanding or abrading the bond area. The primers of the invention are particularly suitable for use with both "high profile" and "low profile" stocks. As such, stocks are defined in commercial practice, and are especially adapted for use with structural adhesives containing polymerizable liquid ethylenically unsaturated compounds, including such compounds having at least one terminal vinyl group, and including both monomeric and polymeric compounds.

Molded or laminated plastic compositions, especially fiber reinforced plastic compositions, are widely utilized in forming assemblies which make-up automobile body panels, truck cabs, boats and the like. Adhesive bonding is the preferred method of joining such plastic compositions to form the desired assembly, by distributing load stresses over larger areas rather than concentrating such stresses as is the case with rivets, bolts or spotwelding, and by reducing or eliminating costly finishing operations necessitated by riveting and welding. Unfortunately, the use of adhesives to bond plastic materials to each other is not without problems. The normally smooth, inert plastic surfaces do not foster the formation of a secure and enduring bond between the adhesive and the plastic substrate.

One technique which has been utilized to promote adhesion between adhesives and plastic substrates involves abrading the bond area of the substrate by grit or sand blasting to provide a surface which is more amenable to adhesive assembly. However, such surface abrasion in the bond area weakens the substrate in the precise areas where maximum strength is needed and renders the bond area susceptible to absorption of solvents which can weaken and attack the plastic composition. In addition, the absorbed solvents can re-emerge against the adhesive interface, especially during high temperature bake cycles, such as are used to cure paints. Surface abrasion also requires additional processing steps, requires skilled labor to prepare seams without destroying cosmetic surface contours and, especially when working with fiber reinforced plastic materials, creates health hazards due to particles creating during the abrading step, thus requiring protective equipment for workers and expensive exhaust and removal equipment.

Surface abrading is particularly undesirable in the case of fiber reinforced plastic compositions made with "low profile" polyester formulations because of the loss in strength of such compositions due to such abrading. Low profile polyester formulations are polyester resins filled or diluted with thermoplastic polymers such as polyvinyl chloride. The thermoplastic diluent prevents the polyester resin from shrinking away from the surfaces of the reinforcing fibers which are incorporated with the polyester resin to increase its strength. The reduced shrinkage gives the composition a "low profile" or smooth regular surface as contrasted to the "high" or "standard" profile of usual fiber reinforced plastic compositions which have irregularly contoured surfaces as a result of exposed reinforcing fibers in the compositions.

Because of the serious problems created with the various abrading techniques, attempts have been made to develop alternative procedures for bonding plastic materials to the same or different plastic materials. One such procedure is the use of various treating agents or primers, such as the tertiary amines described in U.S. Pat. No. 3,647,513, which are applied to fiber reinforced plastic surfaces prior to application of urethane adhesive. However, this procedure does not adequately soften the plastic substrate in the bond area but does severely weaken the substrates. Additionally, amines quite often adversely affect the curing speed of adhesive compositions. Another procedure utilizes a solution of polyisocyanate in trichloroethylene as a surface primer for fiber reinforced plastic materials. While effective, this procedure requires that adhesive bonding be effected within the narrow window between the time the primer initially hardened and the time after application of the primer when it becomes so hardened and inert that adhesive bonds cannot be formed. Another such procedure, described in U.S. Pat. Nos. 3,838,093 and 3,962,498, utilizes an organic solvent solution of a partial urethane adduct as a surface primer for the fiber reinforced plastics. While very effective with both "high profile" and "low profile" plastic materials, the primer compositions are difficult to make, have inconsistent shelf-stability characteristics and lack high-temperature resistance. This latter deficiency is becoming increasingly more critical as the service requirements of finished plastics, especially fiber reinforced plastic, assemblies become more severe.

Thus, it can be seen that the art is still searching for suitable agents for treating plastic, including fiber reinforced plastic, substrates to make them more amenable to adhesive bonding. Such treating agents or primers should meet several criteria. For example, the primer should eliminate any need for abrading or other surface cleaning procedures prior to application of the adhesive. The primer should be in such a form that it can be conveniently and economically applied to the plastic substrate and not require any special post-application treatment, such as baking, to effect a bond with the substrate. Because it is often necessary that the prime coating be ready for the adhesive coat a short time after its application to the plastic substrate, the primer should be one to which adhesive can be applied in a dried, solvent-free, but unured state. The primer should be able to withstand exposure to elevated temperatures, such as are encountered in paint bake cycles, without adversely influencing the adhesive bond. Lastly, the primer should have sufficient pot life so that it can be prepared and used over a period of time sufficient to accommodate at least one work shift, or preferably, 8-12 hours minimum pot life.

It is an object of the present invention to provide a primer composition for the adhesive bonding of plastic materials, including "high-profile" and "low-profile" fiber reinforced plastic materials, without the need for abrading the plastic surface prior to application of the adhesive. It is another object of this invention to provide a primer composition for the adhesive bonding of plastic materials which is capable of being used in a temperature environment in the range from −40° C. to at least 200° C. It is yet another object of this invention to provide a method for the adhesive bonding of plastic materials which does not include a step involving abrading the plastic surface prior to application of the adhesive composition.

In accordance with the present invention, there is provided a shelf-stable, two-part primer composition comprising, as a first part, at least one amino resin and at least one acid catalyst; and as a second part, at least one aromatic compound containing at least two reactive isocyanate groups, which, when mixed, provides a substantially homogeneous solution or dispersion comprising at least one aromatic compound containing at least two reactive isocyanate groups, at least one amino resin and at least one acid catalyst which, when applied to polyester-based plastic materials, including fiber reinforced plastic materials, is effective to enhance adhesive bonding of such plastic materials without the necessity of an abrading step before application of the adhesive composition to the plastic surface. In addition to enhancing adhesion of plastic materials, the primer compositions enable the plastic assemblies to be used over a temperature range from −40° C. to at least 200° C.

The amino resins which are employed in the practice of this invention can be any melamine-formaldehyde or urea-formaldehyde reaction product which is either unetherified or etherified with saturated monohydric alcohols containing from 1 to 4 carbon atoms. Such resins are well-known and are described, as are methods for making such resins, by D. H. Solomon in "The Chemistry of Organic Film Formers", pp. 225–240, John Wiley & Sons, Inc., New York 1967. Representative amino resins include those derived from monomethylolurea, dimethylolurea, trimethylolurea, dimethylolmelamine, trimethylolmelamine, tetramethylolmelamine, pentamethylolmelamine, hexamethylolmelamine, and the corresponding ethers formed by condensing one or more monohydric alcohols having from one to 6 ether groups. Mixtures of such amino resins can be employed. Currently, the preferred amino resin is derived from hexakismethoxymethylmelamine. In addition to Solomon, supra, information relating to amino resins, including their preparation, is found in U.S. Pat. Nos. 2,906,724; 2,918,452; 2,998,410; 2,998,411; 3,107,227 and 3,422,076, which patents are hereby incorporated herein by reference.

The aromatic polyisocyanate compounds which are suitable for use in the practice of this invention are selected from the group consisting of compounds having the structure

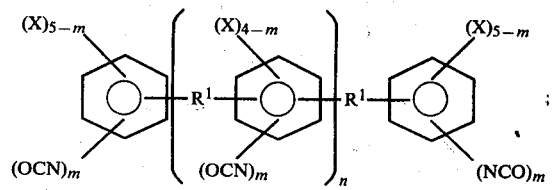

wherein $R^1$ is a divalent organic radical, preferably a divalent aliphatic radical having from 1 to 8 carbon atoms, especially such radicals obtained by removing the carbonyl oxygen atom from an aldehyde or a ketone, and preferably is methylene; m is 1 or 2, and is preferably 1; n is a digit having an average value in the range from zero to 15, preferably 0.1 to 4, and most preferably 0.3 to 1.8; and X is selected from the group consisting of hydrogen, alkyl radicals having from 1 to 8 carbon atoms and alkoxy radicals having from 1 to 8 carbon atoms, with hydrogen being preferred. Representative of such polyisocyanates are methylene-bis(phenyl isocyanate) and polymethylene poly(phenyl isocyanate).

The acid catalysts which are suitable for use in the practice of the invention include substantially any of the known acidic materials which are known to catalyze moisture curing of isocyanate-containing materials. Representative acid catalysts include, without limitation thereto, p-toluene sulfonic acid, xylene sulfonic acid, o- and m-toluene sulfonic acids, ethyl acid phosphate, n-butyl phosphoric acid, phosphoric acid, hydrochloric acid, dibutyltin dilaurate, dibutyltin octoate, triethylene diamine, lead octoate and the like, with dibutyltin dilaurate being currently preferred.

The primer compositions as an admixture, typically comprise from 1 to 20 percent aromatic isocyanate compound, from 0.01 to 10 percent amino resin, 0.05 to 5 percent acid urethanation catalyst, from zero to 20 percent filler materials, with the balance comprising inert organic solvent, based on total weight of admixture. The compositions are typically provided as a two-part primer composition, with one part containing aromatic isocyanate compound and inert solvent and the other part containing the remainder of the ingredients and inert solvent. To facilitate mixing of the two-part primer compositions of this invention, it is preferred to dilute both parts to equal volumes with volatile inert organic solvents. The amount of such solvent in each part will not necessarily be the same, though the volumes of each part are preferably so. When the equal volumes of solvent-diluted parts are mixed together, preferably there will be obtained a solvent diluted mixture containing from 5 to 50, preferably 10 to 35, parts of aromatic polyisocyanate, amino resin and acid catalyst per 100 parts of total mixture, including solvent. Examples of suitable solvents include ethyl acetate, xylene, toluene, butane, 2-ethoxyethyl acetate, methoxyethyl acetate, butoxybutyl acetate, amyl acetate, and other similar esters, ketones, chlorinated analogs and the like.

The plastic materials which are treated in accordance with this invention in forming bonded or laminated structure are well-known, commercially available solid polyester and thermoplastic material-containing polyester compositions. The polyester materials include those which may be made by reacting saturated and unsaturated polycarboxylic acids or their anhydrides, e.g., maleic acid and maleic anhydride, with suitable polyols, e.g., propylene glycol and butylene glycol. Thermoplastic materials which can be incorporated into the polyester compositions, including polyester compositions containing organic or inorganic reinforcing materials, such as fiber glass, carbon fiber and the like, include acrylonitrile-butadiene-styrene and styrene-acrylonitrile plastics, polymers and copolymers of arylic and methacrylic esters, poly(vinyl chloride), and poly(phenylene oxide). Especially preferred plastic materials are the fiber-reinforced thermoplastic material-containing polyester compositions commonly referred to as "low profile" polyester resin compositions.

The primer composition which results upon mixing the two parts, supra, can be applied to thin films, built-up sheets or molded polyester-containing plastic compositions by brushing, spraying, rolling or other suitable technique. The primers are preferably applied as thin films, preferably of 0.5 or less mil wet film thickness. After application, the primer is exposed to ambient conditions of temperature and humidity to evaporate the solvent and at least initiate the curing of the isocyanate compound via catalyzed moisture cure mechanism. Typically, the ambient moisture-cure of the isocyanate compound is effected over a period of 1 hour to 72 hours at wet film thicknesses of 1 mil of greater. The primer film is preferentially applied at wet film thicknesses of 0.5 mil or less, especially 0.1–0.25 mils, at which thicknesses an exposure time at ambient temperature and humidity of 1 minute to 30 minutes is effective to dry the inert solvent and advance the moisture cure of the isocyanate compound to a level at which there are sufficient —NH— groups for subsequent reaction at elevated temperatures with the functional groups of the aino resin component of the primer. The adhesive is applied to the primed substrate following exposure of the wet film of primer to ambient temperature and humidity. Preferably, the adhesive will be applied to each surface being joined and each such surface will have been previously primed in the manner described.

Adhesives which can be utilized in the processes of this invention include those of the class of polymerizable liquid ethylenically unsaturated compounds containing at least one >C=CH$_2$ group. Such adhesives are described in detail in U.S. Pat. Nos. 2,894,932; 3,333,025; 3,725,504; 3,832,274; 3,873,640; 3,840,407; 3,970,709; and 4,223,115; the disclosures of which patents are incorporated herein by reference.

Following application of the adhesive to the partially cured primer, the assemblies are made-up and cured at room temperature for from 5 minutes to one hour and post-baked at 100° to 150° C. for from 5 minutes to 30 minutes, to cure the adhesive and complete the cure of the primer. It is theorized that the primer cures in a sequential fashion; the first phase being the moisture cure of the isocyanate material to provide urethane groups having an active hydrogen on the nitrogen atom, with the second phase being a heat-activated cross-linking reaction between the amino resin and the active hydrogen on the nitrogen atom.

The invention is more fully illustrated by the following examples.

EXAMPLE I

The following two-part primer composition was prepared, amounts are in parts by weight:

| Ingredient | Part A | Part B |
| --- | --- | --- |
| Polymethylene poly(phenyl isocyanate) | 16.0 | 0.0 |
| Urea-formaldehyde amino resin | 0.0 | 2.5 |
| Dibutyltin dilaurate | 0.0 | 0.15 |
| Methylene chloride | 84.0 | 97.35 |

EXAMPLE II

The following two-part primer composition was prepared, amounts are in parts by weight.

| Ingredient | Part A | Part B |
| --- | --- | --- |
| Polymethylene poly(phenyl isocyanate) | 16.0 | — |
| Hexakismethoxy-melamine amino resin | — | 1.0 |
| Dibutyltin dilaurate | — | 0.15 |
| Methylene chloride | 84.0 | 98.85 |

EXAMPLE III

A first urethane partial adduct was prepared by reacting 1 equivalent weight of polymethylene poly(phenyl isocyanate) and 0.5 equivalent weight of 2-hydroxyethyl methacrylate in 51 g anhydrous trichloroethylene solvent. A second urethane partial adduct was prepared by reacting 1 equivalent weight of polymethylene poly(phenyl isocyanate) and 0.2 equivalent weight of hydroxyl-terminated poly(butadiene-styrene) copolymer (CA. 3000 MW) in 51 g methylene chloride solvent. The urethane partial adducts were employed to make the following primer composition, amounts are parts by weight.

| Ingredient | Parts |
| --- | --- |
| Adduct of polymethylene poly(phenyl isocyanate) and 2-hydroxyethyl methacrylate | 9.4 |
| Adduct of polymethylene poly(phenyl isocyanate) and hydroxylated poly(butadiene-styrene) copolymer | 6.6 |
| Hydroxyl-terminated polyester (USM 7804, USM Chemical Corporation) | 4.2 |
| Styrene | 13.7 |
| Methylene chloride | 66.1 |

EXAMPLE IV

The following two-part primer composition was prepared, amounts are parts by weight.

| Ingredient | Part A | Part B |
| --- | --- | --- |
| Polymethylene poly(phenyl isocyanate) | 13.33 | 0.0 |
| Acrylic-modified epoxy resin (epocryl DRH-480, Shell Chemical Company) | 0.0 | 6.67 |
| Dibutyltin dilaurate | 0.0 | 0.24 |
| Methylene chloride | 86.67 | 93.09 |

EXAMPLE V

The individual parts A and B of the Example I, II and IV primer compositions were mixed. These admixtures, and the primer composition of Example III, were applied to polyester-based "low profile" fiberglass reinforced plastic stock. In each case, the fiberglass reinforced plastic stock was coated with an 0.1 mil wet film thickness of primer, which was allowed to moisture cure for 20 minutes at ambient conditions of temperature and humidity. The primed surfaces were coated with a commercial acrylic adhesive (Versilok® 506, a trademarked product of Lord Corporation, Chemical Products Group) catalyzed with benzoyl peroxide. The adhesive was also applied to unprimed abraded and nonabraded fiberglass reinforced plastic stock. The adhesive-coated parts were joined and the adhesive was allowed to cure at room temperature for 60 minutes. Following the room temperature cure, one group of the assemblies was conditioned for 30 minutes at 204° C. Standard lap shear tests were run at room temperature and at 204° C. The results are reported in the following table.

| Assembly | Lap Shear Strength, MPa | |
|---|---|---|
| | R.T. | 204° C. |
| Nonabraded, no primer | 1.4 | — |
| Abraded, no primer | 2.5 | — |
| Primer, Example I | 3.9 | 0.55 |
| Primer, Example II | 4.1 | 0.49 |
| Primer, Example III | 1.9 | 0.15 |
| Primer, Example IV | 2.2 | 0.44 |

The data demonstrated the improved performance, both at room temperature and at elevated temperatures, which is obtained through the use of the primer compositions of this invention (Examples I and II primers).

EXAMPLE VI

Two-part equal volume primer compositions were prepared which were identical to the formulation of Example II, except that the following polyisocyanates were used instead of polymethylene poly(phenyl isocyanate): isophorone diisocyanate; 1,6-hexamethylene diisocyanate biuret; trimethylolpropane-tolylene diisocyanate adduct; triphenylmethane triisocyanate; and 1,6-hexamethylene diisocyanatetolylene diisocyanate dimer. The A and B parts of these primers were mixed and applied to the same fiber reinforced plastic stock as was used in Example V, following the procedure of that Example. The performance of these primers was compared to that of the Example II primer, using the adhesive and procedure of Example V. Qualitative adhesion at room temperature (0 is no adhesion, 4 is stock break) is as follows:

| Isocyanate Compound | Qualitative Adhesion |
|---|---|
| Isophorone diisocyanate | 2 |
| 1,6-Hexamethylene diisocyanate biuret | 2 |
| Trimethylolpropane-tolylene diisocyanate adduct | 1 |
| Triphenylmethane triisocyanate | 1 |
| 1,6-Hexamethylene diisocyanate-tolylene diisocyanate dimer | 1 |
| Polymethylene poly(phenyl isocyanate) | 4 |

The data are self-explanatory.

EXAMPLE VII

Primer compositions were prepared according to the formulations expressed in Table VII-I. These primers were applied and evaluated following the procedure of Example V, using the same acrylic adhesive system. The results are shown in Table VII-II. The data demonstrate the effect of amino resin concentration on adhesion performance at room and elevated temperatures.

TABLE VII-I

| Formulation | 1 | 2 | 3 | 4 | 5 | 6 | 7 | 8 | 9 | 10 |
|---|---|---|---|---|---|---|---|---|---|---|
| Polymethylene poly(phenyl isocyanate) | 6.0 | 6.0 | 6.0 | 6.0 | 6.0 | 6.0 | 6.0 | 6.0 | 6.0 | 6.0 |
| Hexakismethoxymethyl-melamine amino resin | — | 0.25 | 0.5 | 0.75 | 1.0 | — | — | — | — | — |
| Urea-formaldehyde amino resin | — | — | — | — | — | 0.5 | 0.75 | 1.0 | 1.25 | 1.5 |
| Dibutyltin dilaurate | 0.5 | 0.5 | 0.5 | 0.5 | 0.5 | 0.5 | 0.5 | 0.5 | 0.5 | 0.5 |
| Methylene chloride | 93.5 | 93.25 | 93.0 | 92.75 | 92.5 | 93.0 | 92.75 | 92.5 | 92.25 | 92.0 |

TABLE VII-II

| Formulation | Lap Shear Strength, MPa | |
|---|---|---|
| | R.T. | 204° C. |
| 1 | 2.7 | 0.3 |
| 2 | 2.6 | 0.4 |
| 3 | 2.8 | 0.38 |
| 4 | 1.8 | 0.32 |
| 5 | 2.4 | 0.3 |
| 6 | 1.6 | 0.3 |
| 7 | 2.4 | 0.33 |
| 8 | 3.1 | 0.39 |
| 9 | 3.4 | 0.5 |
| 10 | 3.5 | 0.38 |

EXAMPLE VIII

Primer compositions were prepared according to the formulations expressed in Table VIII-I. These primers were applied and evaluated following the procedure of Example V, except that the primed substrates were divided into two groups, with one group having a 2 minute moisture cure and the other group having a 20 minute moisture cure. The results are shown in Table VIII-II. The data demonstrate the beneficial effect of catalysis and of having a fast overcoat, that is, a shorter moisture cure period before application of the adhesive, when employing thin primer films. Data, not reported in this disclosure, indicate that drying times of at least one hour are preferred in cases where primer film wet thickness is greater than one mil.

TABLE VIII-I

| Formulation | 1 | 2 | 3 | 4 | 5 |
|---|---|---|---|---|---|
| Polymethylene poly-(phenyl isocyanate) | 6.0 | 6.0 | 6.0 | 6.0 | 6.0 |
| Hexakismethoxymethyl-melamine amino resin | 0.0 | 0.0 | 0.5 | 0.5 | 0.5 |
| Dibutyltin dilaurate | 0.0 | 0.5 | 0.0 | 0.5 | 1.0 |
| Methylene chloride | 94.0 | 93.5 | 93.5 | 93.0 | 92.5 |

TABLE VIII-II

| Formulation | Moisture Cure, Min. | Lap Shear Strength, MPa R.T. | Lap Shear Strength, MPa 204° C. |
|---|---|---|---|
| 1 | 2 | 2.4 | 0.36 |
| 1 | 20 | 1.9 | 0.37 |
| 2 | 2 | 1.6 | 0.31 |
| 2 | 20 | 1.9 | 0.33 |
| 3 | 2 | 2.0 | 0.35 |
| 3 | 20 | 1.7 | 0.31 |
| 4 | 2 | 3.2 | 0.4 |
| 4 | 20 | 2.0 | 0.44 |
| 5 | 2 | 3.1 | 0.34 |
| 5 | 20 | 2.4 | 0.36 |

EXAMPLE IX

Primer compositions were prepared according to the formulations of Table IX. These primers were applied and evaluated at room temperature only, following the procedure of Example V. The results are reported in Table IX.

TABLE IX

| Formulation | 1 | 2 | 3 | 4 | 5 | 6 | 7 | 8 |
|---|---|---|---|---|---|---|---|---|
| Polymethylene poly-(phenyl isocyanate) | 12.0 | 14.0 | 16.0 | 20.0 | 12.0 | 14.0 | 16.0 | 20.0 |
| Hexakismethoxymethyl-melamine amino resin | 1.0 | 1.0 | 1.0 | 1.0 | — | — | — | — |
| Urea-formaldehyde amino resin | — | — | — | — | 2.5 | 2.5 | 2.5 | 2.5 |
| Dibutyltin dilaurate | 1.5 | 1.5 | 1.5 | 1.5 | 1.5 | 1.5 | 1.5 | 1.5 |
| Methylene chloride | 185.5 | 183.5 | 181.5 | 177.5 | 184.0 | 182.0 | 180.0 | 176.0 |
| Lap Shear Strength, R.T., MPa | 2.4 | 3.0 | 3.4 | 3.4 | 2.7 | 3.4 | 3.9 | 3.7 |

The data demonstrate the effect of concentration of isocyanate compound on adhesion.

EXAMPLE X

Using the primer composition of Example II, various polyester-based fiberglass reinforced plastic stock materials were treated according to the procedure of Example V; except that, instead of conditioning the one group of assemblies at 204° C. following the adhesive room temperature cure cycle, the assemblies were baked at 138° C. for 30 minutes. Fiber tearing bonds were obtained at room and elevated temperatures.

What is claimed is:

1. A method for bonding polyester-based plastic materials comprising:
   (a) treating said polyester-based plastic material with a primer composition comprising at least one aromatic polyisocyanate compound, at least one amino resin and at least one acidic urethanation catalyst;
   (b) exposing such treated polyester-based plastic material to ambient conditions of temperature and humidity for a time sufficient to at least partially moisture-cure said aromatic polyisocyanate compound to form a urethane compound having sufficient —NH— groups for subsequent reaction with functional groups of said amino resin;
   (c) applying to such treated polyester-based plastic material a room temperature-curable adhesive composition comprising ethylenically unsaturated compound having a single vinyl group;
   (d) contacting such adhesive-coated treated polyester-based plastic material with a second polyester-based plastic material, said second plastic material having been treated with said primer composition;
   (e) exposing the resulting assembly at room temperature for a time to at least initiate curing of said adhesive; and
   (f) baking the assembly at a temperature in the range from 100° to 150° C. to react functional groups of said amino resin with said —NH— groups of said urethane compound and complete cure of said primer composition.

2. A method according to claim 1 wherein said amino resin is etherified.

3. A method according to claim 2 wherein said amino resin comprises at least one formaldehyde-melamine condensation product.

4. A method according to claim 3 wherein said urethanation catalyst is selected from the group consisting of dibutyltin dilaurate, dibutyltin octoate, and lead octoate.

5. A method of improving adhesion between, (1), an adhesive of the class of polymerizable liquid ethylenically unsaturated compounds containing a single vinyl group and, (2), a solid polyester-containing plastic material comprising treating such plastic material with a primer composition comprising:
   (a) at least one polyisocyanate compound having the formula:

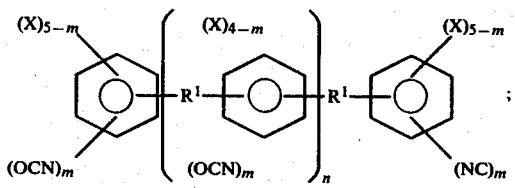

wherein $R^1$ is a divalent organic radical; m is 1 or 2; n is a digit having an average value in the range from zero to 15; and X is selected from the group consisting of hydrogen, alkyl radicals having from 1 to 8 carbon atoms and alkoxy radicals having from 1 to 8 carbon atoms;
   (b) at least one amino resin selected from the group consisting of melamine-formaldehyde and urea-formaldehyde condensation products;
   (c) at least one acidic material which is effective to catalyze moisture curing of isocyanate-functional materials; and
   (d) inert solvent.

6. A method according to claim 5 wherein n has an average value in the range from 0.3 to 1.8.

7. A method according to claim 5 wherein said polyisocyanate compound is present in an amount in the range from 1 to 20 percent by weight, the amount of said amino resin in the range from 0.01 to 10 percent by weight, and the amount of said acidic material is in the range from 0.05 to 5 percent by weight, based on total weight of primer composition.

8. A method according to claim 7 wherein said polyisocyanate compound comprising n has an average value in the range from 0.3 to 1.8.

9. A method according to claim 8 wherein said amino resin comprises at least one formaldehyde-melamine condensation product.

10. A method according to claim 8 wherein said amino resin comprises at least one formaldehyde-urea condensation product.

* * * * *